Patented June 18, 1946

UNITED STATES PATENT OFFICE 2,402,130

PROCESS FOR THE PRODUCTION OF DI-ESTERS OF HYDROXY CARBOXYLIC ACIDS

Edward M. Filachione, Philadelphia, and Charles H. Fisher, Abington, Pa., assignors to the United States of America, as represented by the Secretary of Agriculture No Drawing. Application October 16, 1943, Serial No. 506,528

4 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to the production of di-esters of hydroxy carboxylic acids, such as alkyl alpha-acetoxypropionates. The term "di-ester" as used herein is defined as an ester of an hydroxy acid resulting when both the carboxyl group and the hydroxyl group are esterified.

It is known that di-esters of hydroxy carboxylic acids can be prepared from alkyl esters of hydroxy acids by acetylation with acetic anhydride (Burns, Jones and Ritchie, J. Chem. Soc. 1935, 400; U. S. 2,265,814, Dec. 9, 1941; Smith and co-workers, Ind. Eng. Chem. 34, 473 (1942)), ketene (Claborn and Smith, J. Am. Chem. Soc. 61, 2727 (1939)), and acetyl chloride (Purdie and Williamson, J. Chem. Soc. 69, 828). Furthermore, it is known that alpha-acetoxypropionyl chloride yields alkyl alpha-acetoxypropionates when treated with alcohols (Freudenberg and Markert, Ber. 60B, 2447 (1927)). A disadvantage of these methods is that relatively inaccessible and expensive acid anhydrides or acid chlorides are used as intermediates. Accordingly, an object of this invention is to provide a simple, efficient and low-cost process for manufacturing di-esters of hydroxy carboxylic acids.

A further object is to provide a suitable method for producing methyl alpha-acetoxypropionate, which decomposes into methyl acrylate and acetic acid when pyrolyzed.

A further object is to provide a satisfactory method for converting alpha-acetoxypropionic acid, which is readily obtainable from lactic acid, into its alkyl esters.

Other objects will appear from the following description.

We have found that in the presence of acid catalysts, such as sulfuric acid, phosphoric acid, hydrogen chloride and toluenesulfonic acid, acyloxy carboxylic acids react readily with carboxylic acid esters to form the corresponding di-ester. Thus, we have found that alpha-acetoxypropionic acid reacts with alkyl acetates to form alkyl-acetoxypropionates. The preparation of alkyl alpha-acetoxypropionates by our process avoids entirely the use of acetic anhydride, acetyl chloride, and similar reagents which have been required by previous methods. The alpha-acetoxypropionic acid required for these syntheses can be obtained at low cost by acetylating lactic acid with acetic acid in the presence of an acid catalyst and a suitable entraining agent, such as benzene, ethylene chloride, or toluene. The by-products formed in our process can be used in succeeding preparations.

The following examples illustrate our invention:

Example I

A mixture of 66 g. (0.5 mole) of alpha-acetoxypropionic acid, 92.5 g. (1.25 moles) of methyl acetate, and 0.5 ml. of concentrated sulfuric acid was heated in a closed bottle ("Magnesia" bottle) at 100° C. for 4 hours. The catalyst was then neutralized with 2.0 g. of sodium acetate, and the methyl alpha-acetoxypropionate and unreacted alpha-acetoxypropionic acid were isolated by distillation. There resulted a conversion of 33 percent into methyl alpha-acetoxypropionate. The yield calculated on the basis of alpha-acetoxypropionic acid consumed was 61 percent.

Example II

An experiment identical with that in Example I except that a higher molar ratio of methyl acetate to alpha-acetoxypropionic acid was used (5 to 1 instead of 2.5 to 1, as in Example I) gave a 33 percent conversion into methyl alpha-acetoxypropionate; the yield based on unrecovered acetoxypropionic acid was 77 percent.

Example III

Two and one-half moles of methyl acetate and 0.5 ml. of concentrated sulfuric acid were added to 0.5 mole of alpha-acetoxypropionic acid. After heating for 4 hours in a glass lined bomb at 120° to 126° C., the mixture was neutralized with sodium acetate and distilled. There resulted a 54 percent conversion, and an 81 percent yield of methyl alpha-acetoxypropionate.

Example IV

This experiment was carried out as in Example III except that a higher temperature of reaction was used, i. e., 140° to 150° C. The result was a 60 percent conversion and an 84 percent yield of methyl alpha-acetoxypropionate.

Example V

A mixture of 0.5 mole of alpha-acetoxypropionic acid, 2.5 moles of ethyl acetate and 0.5 ml. of concentrated sulfuric acid was heated in a glass lined bomb for 4 hours at 122° to 130° C. The catalyst was neutralized with sodium acetate and the mixture distilled. There resulted a 52 percent conversion and a 64 percent yield of ethyl alpha-acetoxypropionate.

Example VI

A mixture of 0.5 mole of alpha-acetoxypropionic acid, 0.7 mole phenyl acetate and 0.5 ml. of concentrated sulfuric acid was heated for 5 hours in apparatus containing a Vigreux column. The bath temperature was 125° to 140° C., and the system was maintained at a pressure of 50 mm. in order to distill the acetic acid as formed. However, the amount of acetic acid which distilled during the reaction was slight. After neutralization of the sulfuric acid with sodium acetate, the mixture was distilled. The phenyl alpha-acetoxypropionate and unreacted alpha-acetoxypropionic acid, which boil very close together, were collected at 112° to 115° C. under 1 to 2 mm. of mercury pressure. This fraction was then washed with sodium bicarbonate solution to give pure phenyl alpha-acetoxypropionate; B. P. 103° to 104° C. at about 1 mm. The conversion was 20 percent and the yield, based on unrecovered alpha-acetoxypropionic acid, was 45 percent. Index of refraction ($n_D$ at 20° C.) was 1.4835.

Example VII

A mixture of 0.5 mole of alpha-acetoxypropionic acid, 1.0 mole of benzyl acetate and 0.5 ml. of concentrated sulfuric acid was heated in distillation equipment for 4 hours at 125° to 130° C. under 50 mm. of pressure. After neutralization of the catalyst, the mixture was distilled. A conversion of 34 percent and a 61 percent yield of benzyl alpha-acetoxypropionate resulted.

Having thus described our invention, we claim:

1. The process which comprises reacting alpha-acetoxypropionic acid with a compound selected from the group consisting of alkyl and aryl acetates, in the presence of an acid catalyst at a temperature of the order of 100° to 150° C., to form the corresponding alkyl or aryl alpha-acetoxypropionate.

2. The process which comprises reacting alpha-acetoxypropionic acid with methyl acetate, in the presence of a catalytic amount of sulfuric acid at a temperature of the order of 100° to 150° C., to form methyl alpha-acetoxypropionate.

3. The process which comprises reacting alpha-acetoxypropionic acid with phenyl acetate, in the presence of a catalytic amount of sulfuric acid at a temperature of the order of 100° to 150° C., to form phenyl alpha-acetoxypropionate.

4. The process which comprises reacting alpha-acetoxypropionic acid with benzyl acetate, in the presence of a catalytic amount of sulfuric acid at a temperature of the order of 100° to 150° C., to form benzyl alpha-acetoxypropionate.

EDWARD M. FILACHIONE.
CHARLES H. FISHER.